Nov. 19, 1963 A. W. HARRISON 3,111,199
SHOE DRUM BRAKES HAVING AUTOMATIC ADJUSTING MEANS
Filed Feb. 8, 1961 3 Sheets-Sheet 1
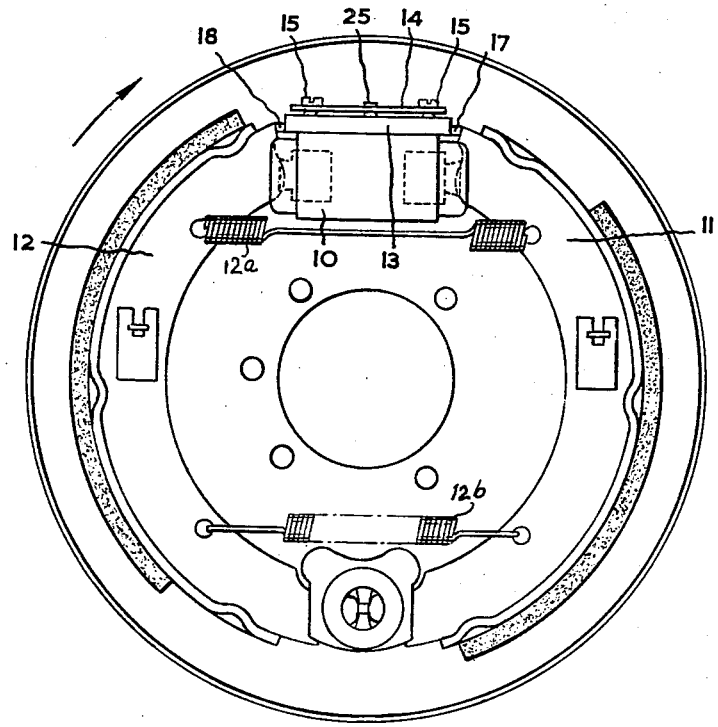
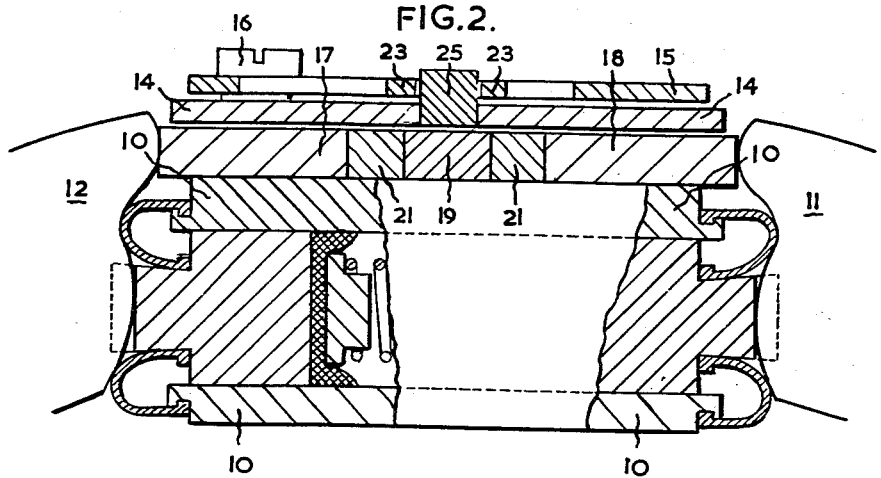

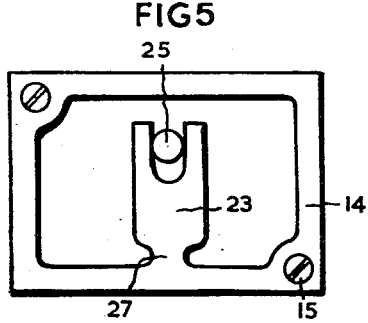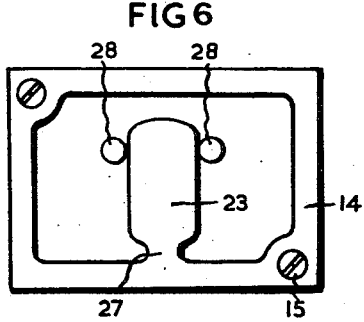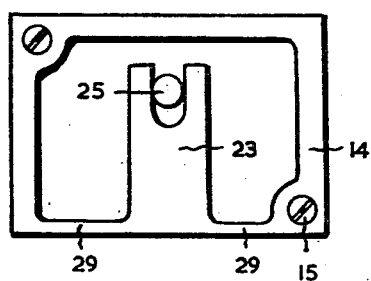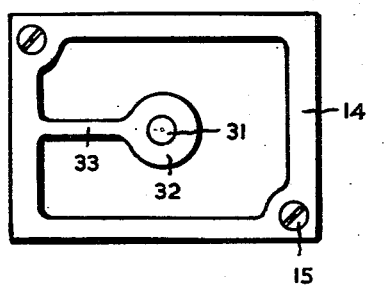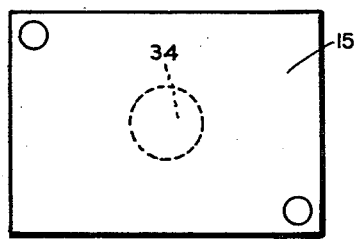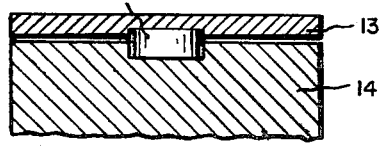

United States Patent Office 3,111,199
Patented Nov. 19, 1963

3,111,199
SHOE DRUM BRAKES HAVING AUTOMATIC
ADJUSTING MEANS
Anthony William Harrison, Selly Oak, Birmingham, England, assignor to Girling Limited, Birmingham, England, a British company
Filed Feb. 8, 1961, Ser. No. 87,823
Claims priority, application Great Britain Feb. 12, 1960
7 Claims. (Cl. 188—78)

This invention relates to improvements in brakes of the shoe-drum type in which arcutae shoes carrying friction linings are located within a rotatable drum with which they are brought into engagement by an expander located between the shoe ends.

In brakes of this type, it is frequently necessary for the housing or housings of the expander to be free to move through a limited distance to compensate for unequal wear of the shoe linings, but this leads to complications, as in the off position of the brake, vibration or differences in shoe spring loading can lead to a shoe being brought into engagement with the drum. Friction means can be incorporated to overcome this difficulty but these tend to be unpredictable in operation owing to the effects of oil, mud, water and other extraneous factors.

According to our invention, a housing for an expander which has a permitted movement on a stationary member in the application of a brake, is positioned in the direction of movement by a centralising member which yields nonelastically under the brake applying force when unequal wear of the shoe linings has taken place.

When the housing is moved away from its initial position on application of the brake after unequal wear of the shoe linings has taken place, the centralising member yields and takes up a new position in which it locates the housing in the new position to which it has been moved.

The centralising member may be arranged in various ways. For example, in one preferred arrangement a peg or equivalent member on the expander housing is received in a slot or hole in a finger which is carried by a stationary plate or the like forming part of the guiding means for the housing and which is adapted to bend or stretch if the housing moves relative to the stationary plate or the like when the brake is applied.

Figure 3:
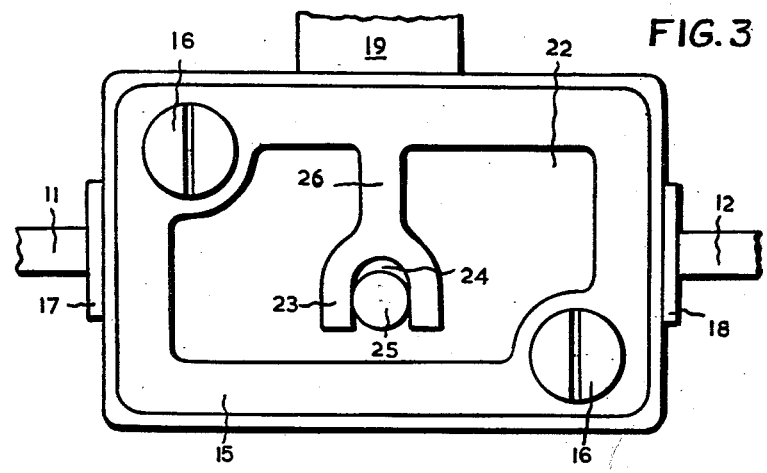
Figure 4:
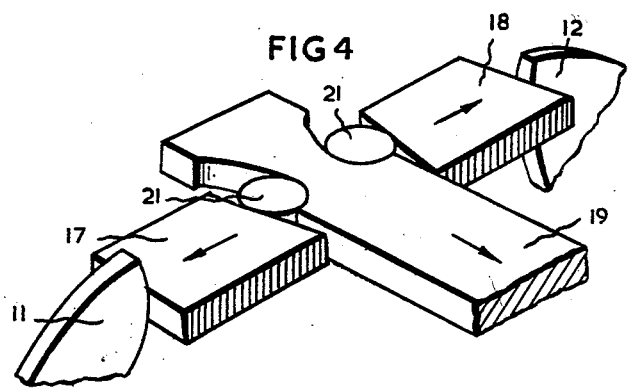

Some practical forms of our invention are illustrated diagrammatically in the accompanying drawings in which:

FIG. 1 is a front elevation of a shoe drum brake embodying one form of our invention;
FIG. 2 is an enlarged view partly in section of the actuators for the brake shoes;
FIG. 3 is a plan of FIG. 2;
FIG. 4 is a perspective view of the expander;
FIGS. 5 to 8 are plan views similar to FIG. 3 but showing various other forms of yielding centraliser;
FIG. 9 is a section showing another form of yielding centraliser; and
FIG. 10 is a plan of the arrangement shown in FIG. 9.

In the construction shown in FIGS. 1 to 4, 10 is a stationary member located between the ends of opposed arcuate brake shoes 11, 12, the shoes carrying thte usual friction linings for engagement with a rotatable brake drum. The stationary member 10 may be a bracket secured to the usual stationary back plate 13 of the brake, but in the construction illustrated it is formed by a double ended hydraulic cylinder assembly in which work opposed pistons for separating the shoes by hydraulic means.

A housing 14 for a mechanical expander is slidably guided between the upper surface of the member 10 and a plate 15 which is secured to the member 10 by screws 16. Spacing collars or sleeves of an axial length slightly greater than the depth of the housing 14 are mounted on the screws between the plate 15 and the member 10, and the screws pass through elongated slots in the housing so that the housing is free to move in a direction parallel to the movement of the shoe ends in the application of the brake to compensate for unequal wear of the shoe linings. The expander itself may be of any convenient type, such as the well-known type shown in FIG. 4, in which 17, 18 are opposed tappets located between the shoe ends and a transversely movable wedge member 19, free running rollers 21 being located between the wedge member and the inner ends of the tappets which are parallel to the inclined faces of the wedge member. The shoes are held in engagement with the outer ends of the tappets by the usual pull-off springs 12a and 12b seen in FIGURE 1.

The plate 15 is made of relatively soft and inelastic material such as mild steel and has a large central opening 22. An integral finger 23 projects transversely into the opening from one side thereof, and a slot 24 in its free end receives a peg 25 or equivalent member integral with or rigidly secured to the expander housing 14 to locate the housing.

An intermediate portion 26 of the finger is relatively narrow and its resistance to bending is sufficiently low to allow it to bend and take up a new position when the housing 14 is moved away from its initial position on application of the brake after unequal wear of the shoe linings has taken place.

When the brake is released, the finger locates the housing in the new position to which it has been moved with the shoes centralised with respect to the drum.

In the modification shown in FIGURE 5, the finger 23 is formed with a relatively short neck 27 of reduced width and bends at the neck.

In the modification shown in FIGURE 6, the finger is of the same form as the finger shown in FIGURE 5, but instead of being slotted to receive a peg on the plate 15, it is located between two spaced pegs 28.

In the modification shown in FIGURE 7, the finger 23 is of substantial width throughout its length, but is integral with a portion 29 of the plate on one side of the opening which is of small width, so that when sufficient force is applied to the finger the portion 29 of the plate on each side of the base of the finger bends to allow the finger to take up a new position.

In the modification shown in FIGURE 8, a peg 31 on the expander housing is received in a hole in a head 32 on the free end of a finger 33 of small cross-section which is integral with one end of the plate 15 and is parallel to the direction of movement of the shoe ends. The end of the plate which carries the finger is adjacent to the trailing shoe of the brake and when the brake is applied after wear of the shoe linings has taken place, the housing moves towards the other end of the plate 15 so that the finger stretches and locates the expander and shoes in a new centralised position on release of the brake.

In the modification shown in FIGURES 9 and 10, a cylindrical plug 34 of soft metal or plastic is located in two co-operating cylindrical recesses in the expander housing 14 and the plate 15 respectively. The combined depth of the recesses is substantially equal to the depth of the plug, and initially the two recesses are in alignment. When the brake is applied after wear of the shoe linings has taken place, the plug is subjected to a shearing force and is deformed so that when the brake is released the expander housing is located in a new position relative to the stationary plate 15.

The bending or stretching of the finger or the deformation of the plug can take place in very small steps so that the position of the expander housing is continuously adjusted as the shoe linings wear and a substantially constant and equal clearance is maintained between both shoes and the drum throughout the life of the linings.

In the forms of the invention illustrated and described above, the yielding centralising member locates the housing of a mechanical expander for the brake shoes, but it will be appreciated that the centralising member can equally well locate an hydraulic cylinder or like hydraulic expander which has a permitted movement on the back-plate of the brake in the direction of movement of the shoe ends.

I claim:

1. A shoe drum brake comprising a rotatable drum, shoes cooperating with the drum, friction linings carried by said shoes, a stationary member, an actuator for actuating said shoes to bring the friction linings into engagement with the drum, a housing for said actuator movable in the direction of movement of the shoe ends to compensate for unequal wear of the friction linings, and a centralizing member of a relatively soft and inelastic material which locates said housing relative to said stationary member and which yields non-elastically under the brake-applying force to locate the shoes centrally with respect to the drum when unequal wear of the shoe linings has taken place.

2. A shoe drum brake comprising a rotatable drum, shoes cooperating with the drum, friction linings carried by said shoes, a stationary back plate adjacent to the drum, a double-ended hydraulic actuator for said shoes located between adjacent ends of the shoes and fixed on said back-plate, a mechanical actuator for the shoes, a housing for said mechanical actuator slidably mounted on said hydraulic actuator for movement in a direction parallel to the direction of movement of said shoe ends in the application of the brake, and a centralizing member of a relatively soft and inelastic material which locates said housing relative to said back-plate and which yields non-elastically under the brake-applying force to locate the shoes centrally with respect to the drum when unequal wear of the shoe linings has taken place.

3. A shoe drum brake comprising arcuate shoes located within a rotatable drum, friction linings carried by said shoes, a stationary member, an expander located between adjacent ends of the shoes for separating the shoes to bring the friction linings into engagement with the drum, a housing for said expander movable in the direction of movement of the shoe ends to compensate for unequal wear of the friction linings, and means for centralising the said housing and shoes relative to the drum, said means including a member of a relatively soft and inelastic material supported at one end to said stationary member and associated with the housing at its other end so as to deform and take up a new position when the housing is moved away from its initial position on application of the brake after unequal wear of the shoe linings has taken place, whereby on release of the brake the expander housing and shoes are located in a new centralised position.

4. A shoe drum brake as in claim 3, wherein said centralising means comprises a fixed plate rigidly secured to said stationary member and a bendable finger integral with and projecting from said fixed plate in a direction substantially at right angles to the direction of movement of the expander housing, and means on the expander housing engaging said finger adjacent to its free end.

5. A shoe drum brake as in claim 3 wherein said centralising means comprises a fixed plate rigidly secured to said stationary member and an inelastically stretchable member extending from said fixed plate in a direction parallel to the direction of movement of the expander housing and a peg on the expander housing engaging in an opening in a head on the free end of said inelastically stretchable member.

6. A shoe drum brake as in claim 3 wherein said centralising means comprises a fixed plate rigidly secured to said stationary member and a finger integral with and projecting from a bendable portion of said fixed plate, and means on the expander housing engaging said finger adjacent to its free end.

7. A shoe drum brake as in claim 3 wherein said centralising member comprises a plug of a soft and inelastic material engaging in complementary recesses in the expander housing and in an adjacent fixed member, the recesses being initially in alignment and the plug being distorted under a shearing force when the housing moves relative to the fixed member.

References Cited in the file of this patent

UNITED STATES PATENTS 2,196,396    Lane    Apr. 9, 1940

FOREIGN PATENTS 779,793    Great Britain    July 24, 1957